United States Patent Office 2,788,364
Patented Apr. 9, 1957

2,788,364

QUATERNARY AMMONIUM SALTS OF DIALKYL-AMINOALKYL FLUORENE - 9 - CARBOXYLATES AND THE PREPARATION THEREOF

John W. Cusic, Skokie, and Richard A. Robinson, Morton Grove, Ill., assignors, by mesne assignments, to G. D. Searle & Co., Skokie, Ill., a corporation of Delaware No Drawing. Application January 15, 1953, Serial No. 331,511

6 Claims. (Cl. 260—469)

This invention relates to quaternary ammonium salts of dialkylaminoalkyl fluorene-9-carboxylates and to the preparation thereof. In particular this invention relates to compounds of the following general structural formula

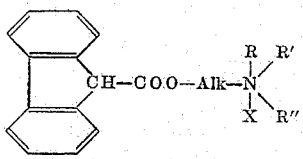

wherein Alk is a lower alkylene radical containing at least 2 and not more than 4 carbon atoms; R, R', and R'' are lower alkyl radicals containing not more than 4 carbon atoms; and X is one equivalent of an anion.

In the compounds of the foregoing formula Alk represents alkylene radicals such as ethylene, propylene, butylene, trimethylene, tetramethylene, and like bivalent radicals derived from saturated aliphatic hydrocarbons containing 2 to 4 carbon atoms. The radicals R, R' and R'' represents such lower alkyl radicals as methyl, ethyl, propyl, isopropyl, butyl, isobutyl, and secondary butyl. The substituent X represents one equivalent of an anion and includes such non-toxic anions as chloride, bromide, iodide, methyl sulfate, ethyl sulfate, benzenesulfonate, toluenesulfonate, tartrate, succinate, malate, acetate, citrate, nitrate, sulfate, phosphate, sulfamate, and the like.

The compounds of this invention as described above are useful in medicine as anticholinergic agents. They have the property of blocking or inhibiting the transmission of nerve impulses across ganglia, para-sympathetic myoneural junctions and skeletal myoneural junctions. These compounds are generally soluble in water and aqueous solutions of alcohols and other water-soluble organic solvents. They may be administered in the form of aqueous solutions or in solid form as tablets or capsules.

The quaternary ammonium salts which comprise this invention are conveniently prepared by reacting a basic ester of the formula

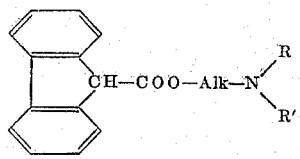

wherein Alk, R and R' have the meanings given hereinabove, with an alkyl ester of the formula $$R''-X'$$

wherein R'' has the meaning given hereinabove and X' represents halogen, alkyl sulfate, or arylsulfonate radicals. These reactions are preferably carried out at elevated temperatures in the range of 50–150° C. in inert solvents such as acetone, methyl ethyl ketone, methanol, ethanol, isopropanol, chloroform, or nitromethane. Lower temperatures between 0° and 50° C. are also satisfactory. Generally the reactions are carried out in a closed system if a lower alkyl halide is used as one of the reagents. With higher boiling reagents the reactions may be carried out in open systems at reflux temperature. In most instances the quaternary ammonium salt crystallizes from the cooled reaction mixture and may be isolated by filtration. In some instances it may be necessary to precipitate the salt by the addition of a solvent such as ether or a low-boiling hydrocarbon in order to lower the solubility of the salts in the reaction mixture. The salts may be further purified by recrystallization from suitable solvents.

In the event that salts are desired in which the anion represented by X is different from the anion represented by X', the anion may be interchanged by reaction of the quaternary ammonium salt with a heavy metal salt of an acid providing the appropriate anion. For example halide ions may be replaced by tartrate ions by reaction with silver tartrate. Likewise citrate, nitrate, malate and other ions described above can be introduced by use of silver citrate, silver nitrate, lead malate and similar salts. These reactions are carried out by agitating the reagents in aqueous solvents such as dilute alcohol or dilute acetone. The heavy metal salts are then removed by filtration and the quaternary ammonium salts are isolated by evaporation of the filtrate.

Our invention is disclosed in further detail by the following examples which are representative of methods of preparing the compounds within the scope of this invention but which are not to be construed as limiting the invention in spirit or in scope. Relative amounts of materials are given in parts by weight and temperatures are recorded in degrees centigrade (° C.).

The present application is a continuation-in-part of our abandoned, copending application Serial No. 136,854, filed January 4, 1950, which is a continuation-in-part of our abandoned, copending application Serial No. 80,562, filed March 9, 1949.

Example 1

A solution of 40 parts of β-dimethylaminoethyl fluorene-9-carboxylate and 20 parts of methyl chloride in 200 parts of anhydrous acetone is heated in a closed vessel at 100° C. for two hours. The quaternary salt separates as an oil. The salt is removed, dissolved in isopropanol, and diluted with dry ether. β-Dimethylaminoethyl fluorene-9-carboxylate methochloride crystallizes out of the solution and is collected on a filter, washed with dry ether, and dried. It forms hygroscopic crystals which do not have a sharp melting point, but which are completely liquefied at 205° C. The salt has the formula

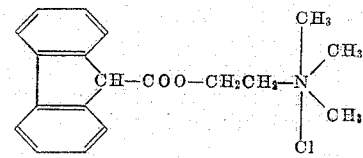

Example 2

30 parts of β-dimethylaminoethyl fluorene-9-carboxylate and 20 parts of ethyl bromide in 80 parts of anhydrous acetone are reacted in a closed vessel for 15 hours at 50–65° C. On chilling a partially crystalline quaternary salt is formed. This is triturated with dry ether and forms crystals of β-dimethylaminoethyl fluorene-9-carboxylate ethobromide. This product has no definite melting point, but is completely liquefied at 210° C. It has the formula

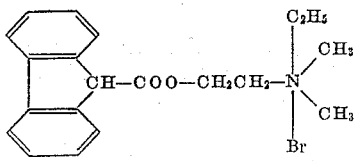

Example 3

20 parts of β-diethylaminoethyl fluorene-9-carboxylate hydrochloride are dissolved in water, treated with an excess of 20% caustic soda solution, and extracted with ether. The ether solution is dried wth anhydrous potassium carbonate and evaporated under vacuum at 0° C. The residue of β-diethylaminoethyl fluorene-9-carboxylate is dissolved in 120 parts of anhydrous acetone containing 6 parts of methyl chloride. The solution is heated at 100° C. for an hour, then allowed to come slowly to room temperature. About one-half of the acetone is removed by evaporation under vacuum. The residual solution is poured into 210 parts of dry ether. An oily precipitate of β-diethylaminoethyl fluorene-9-carboxylate methochloride results. This salt could not be crystallized. It is soluble in water, alcohol and chloroform and moderately soluble in acetone, isopropanol, ethyl acetate and methyl ethyl ketone. It has the formula

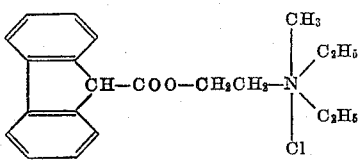

Example 4

A solution of 346 parts of β-diethylaminoethyl fluorene-9-carboxylate hydrochloride in 1000 parts of water is treated with an excess of concentrated ammonia solution and then extracted thrice with chloroform. The extract is dried and filtered, and then 130 parts of methyl bromide are added and the resulting solution is refluxed for 30 minutes. The chloroform is removed under vacuum and the residue is dissolved in the minimum of warm methyl ethyl ketone. The resulting solution is filtered and chilled, and the crystals of β-diethylaminoethyl fluorene-9-carboxylate methobromide are collected on a filter and washed with methyl ethyl ketone. This salt melts at 111–117° C. and a sample on analysis showed 3.43% nitrogen (calculated 3.46%). It has the formula

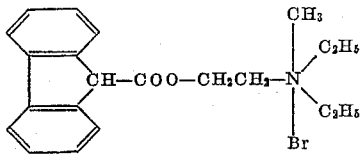

Example 5

A solution of 20 parts of β-diethylaminopropyl fluorene-9-carboxylate and 15 parts of ethyl bromide in 45 parts of methyl ethyl ketone is kept at 60° C. for 10 hours. The solvent is then removed by evaporation and the residue of β-diethylaminopropyl fluorene-9-carboxylate ethobromide is triturated with dry ether, separated and dried. This salt has the formula

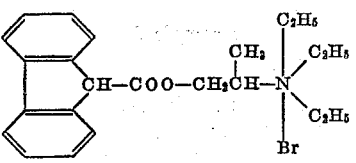

Example 6

By the method of Example 5 γ-diethylaminopropyl fluorene-9-carboxylate methobromide is formed from 20 parts of γ-diethylaminopropyl fluorene-9-carboxylate and 12 parts of methyl chloride. This salt has the formula

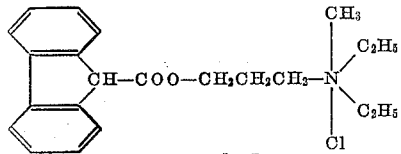

Example 7

A solution of 265 parts of fluorene-9-carboxylic acid and 220 parts of N-(β-chloroethyl)-2,6-lupetidine in 1200 parts of isopropanol is refluxed for 3 hours. The solvent is evaporated at low pressure and the crystalline residue of β-lupetidinoethyl fluorene -9-carboxylate hydrochloride is collected on a filter, washed well with dry ether and dried at 70° C. It melts at 180–195° C. This material is dissolved in water, treated with a small excess of potassium carbonate and extracted with ether. The ether extract is dried and evaporated at low pressure, leaving an oily residue of β-2,6-lupetidinoethyl fluorene-9-carboxylate.

34 parts of β-2,6-lupetidinoethyl fluorene-9-carboxylate are dissolved in 160 parts of methyl ethyl ketone containing 16 parts of methyl bromide. The solution is kept at room temperature for 9 hours during which time some crystals of the quaternary amonium salt form. About half the solvent is removed by evaporation and dry ether is added. A further precipitate of crystals forms. The crystalline salt is collected on a filter, washed with ether and dried. It melts at about 187° C. and has the formula

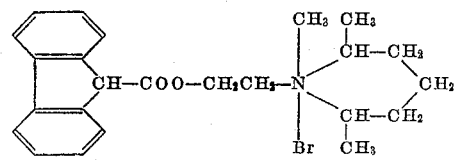

Example 8

A solution of 210 parts of fluorene-9-carboxylic acid and 170 parts of β-diisopropylaminoethyl chloride in 790 parts of isopropanol is heated to reflux for 2 hours. The reaction mixture is cooled and poured into 3500 parts of dry ether. The crystalline precipitate of β-diisopropylaminoethyl fluorene-9-carboxylate hydrochloride is collected on a filter, washed with dry ether and dried at 70° C. This salt melts at 115–118° C.

30 parts of β-diisopropylaminoethyl fluorene-9-carboxylate hydrochloride are dissolved in ice water, covered with 350 parts of ether and treated with an excess of solid potassium carbonate. The mixture is thoroughly agitated and the ether layer separated and dried. The ether extract is filtered and evaporated under vacuum at 0° C. The oily residue of 25 parts of β-diisopropylaminoethyl fluorene-9-carboxylate is dissolved is 40 parts of methyl ethyl ketone containing 11 parts of methyl bromide and the solution is kept at 70° C. in a pressure vessel for 15 hours. On chilling a crystalline precipitate of β-diisopropylaminoethyl fluorene - 9 - carboxylate methobromide forms. This is collected on a filter, washed with methyl ethyl ketone, dried at 70° C., and recrystallized from isopropanol. This salt melts at 124–125° C. and has the formula

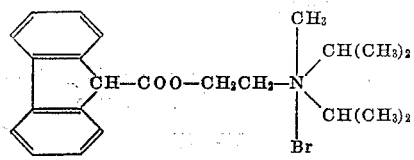

Example 9

100 parts of 9-hydroxyfluorene-9-carboxylic acid are dissolved in 630 parts of isopropanol in which 12 parts of metallic sodium have previously been dissolved. 65 parts of β-dimethylaminoethyl chloride hydrochloride are added and the reaction mixture is refluxed for 6 hours with good agitation. The chilled reaction mixture sets to a solid mass. This is broken up and filtered and washed with isopropanol. The precipitate is dissolved in a minimum of water, treated with an excess of caustic soda solution and the resulting suspension is extracted with ether. The ether solution is dried and treated with an excess of alcoholic hydrogen chloride. The resulting β-dimethylaminoethyl 9-hydroxyfluorene-9-carboxylate hydrochloride is separated and dried. It melts at 230° C.

35 parts of the foregoing salt are converted to the anhydrous base according to the method in Example 3. The base so obtained is dissolved in 95 parts of dry acetone containing 18 parts of methyl chloride. After 15 hours at room temperature the precipitate of β-dimethylaminoethyl 9-hydroxyfluorene-9-carboxylate methochloride is separated and washed with ether and dried. It melts at about 223° C.

We claim:

1. A quaternary ammonium salt of the formula

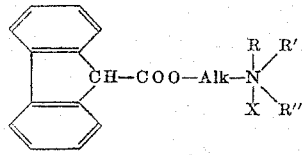

wherein Alk is an alkylene radical containing at least 2 and not more than 4 carbon atoms; R, R' and R'' are alkyl radicals containing not more than 4 carbon atoms; and X is one equivalent of an anion.

2. A quaternary ammonium salt of the formula

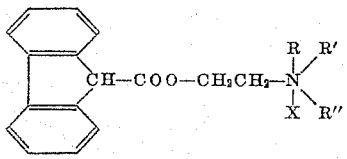

wherein R, R' and R'' are alkyl radicals containing not more than 4 carbon atoms and X is one equivalent of an anion.

3. A compound as in claim 2 wherein X is halogen.

4. β-Diethylaminoethyl fluorene-9-carboxylate methochloride.

5. β-Dimethylaminoethyl fluorene-9-carboxylate ethobromide.

6. β-Diethylaminoethyl fluorene-9-carboxylate methochloride.

References Cited in the file of this patent

UNITED STATES PATENTS

| | | |
|---|---|---|
| 2,262,754 | Burtner | Nov. 18, 1941 |
| 2,399,736 | Holmes et al. | May 7, 1946 |

FOREIGN PATENTS

| | | |
|---|---|---|
| 680,925 | Great Britain | Oct. 15, 1952 |

OTHER REFERENCES

Larsson et al.: Chem. Abst., 42, 676 (1948).

"New and Nonofficial Remedies," J. P. Lippincott Co., 1948, pp. 250–5.

Jensen et al.: Acta Chemica Scandinavia 2, 381–383 (1948).